United States Patent [19]

Wallon et al.

[11] Patent Number: 5,308,914
[45] Date of Patent: May 3, 1994

[54] AQUEOUS POLYURETHANE DISPERSIONS

[75] Inventors: Alexander Wallon, Hassloch; Lothar Maempel, Bruehl; Gerhard Auchter, Bad Durkheim; Horst Seibert, Fussgoenheim, all of Fed. Rep. of Germany

[73] Assignee: BASF Aktiengesellschaft, Ludwigshafen, Fed. Rep. of Germany

[21] Appl. No.: 973,949

[22] Filed: Nov. 9, 1992

[30] Foreign Application Priority Data

Nov. 15, 1991 [DE] Fed. Rep. of Germany ....... 4137660

[51] Int. Cl.$^5$ .......................... C08J 3/03; C08K 3/20; C08L 75/00
[52] U.S. Cl. .................................. 524/591; 524/541; 523/415
[58] Field of Search ................. 524/541, 591; 523/415

[56] References Cited

FOREIGN PATENT DOCUMENTS 3903538 8/1990 Fed. Rep. of Germany .
9202566 2/1992 World Int. Prop. O. .

Primary Examiner—Paul R. Michl
Assistant Examiner—U. K. Rajguru
Attorney, Agent, or Firm—Oblon, Spivak, McClelland, Maier & Neustadt

[57] ABSTRACT

Aqueous dispersions containing a polyurethane and from 5 to 60% by weight, based on the polyurethane, of an adhesion-improving polymer, the polyurethane consisting essentially of (a) organic diisocyanates,
(b) dihydroxy compounds which have a molecular weight of from more than 500 to 5,000 g/mol and contain no ionic groups or groups convertible into ionic groups,
(c) compounds having one or two functional groups reactive toward isocyanate and at least one ionic group or group convertible into an ionic group and
(d) compounds having at last 3 isocyante groups or at least 3 functional groups reactive toward isocyanate,
(e) optionally compounds which differ from (c) and have two functional groups reactive toward isocyanate and a molecular weight of from 60 to 500 g/mol, the compounds (d) being used in amounts such that the functionality F of all components is from 2.01 to 2.5, and the polyurethane or a prepolymer thereof is prepared in a water-miscible solvent boiling below 100° C. and, after addition of the adhesion-improving polymer, is dispersed in water.

7 Claims, No Drawings

AQUEOUS POLYURETHANE DISPERSIONS

The present invention relates to aqueous dispersions containing a polyurethane and from 5 to 60% by weight, based on the polyurethane, of an adhesion-improving polymer, wherein the polyurethane consists essentially of
- (a) organic diisocyanates,
- (b) dihydroxy compounds which hove a molecular weight of from more than 500 to 5,000 g/mol and contain no ionic groups or groups convertible into ionic groups,
- (c) compounds having one or two functional groups reactive toward isocyanate and at least one ionic group or group convertible into an ionic group and
- (d) compounds having at least 3 isocyanate groups or at least 3 groups reactive toward isocyanate,
- (e) with or without compounds which differ from (c) and have two functional groups reactive toward isocyanate and a molecular weight of from 60 to 500 g/mol, and compounds (d) are used in amounts such that the functionality F of all components, which is defined by the quotient $$F = \frac{\text{Number of moles of all isocyanate groups and functional groups reactive with isocyanate}}{\text{Number of moles of all components}}$$

is from 2.01 to 2.5, and the polyurethane or a prepolymer thereof is prepared in a water-miscible solvent boiling below 100° C. and, after addition of the adhesion-improving polymer, is dispersed in water and, in the case of the prepolymer, the further reaction to give the polyurethane is then carried out.

German Patent Application 40 24 567 and DE-A-39 03 538 disclose emulsifier-free dispersions for use as an adhesive, which contain a polyurethane and further polymers, for example a phenol/formaldehyde resin, for improving the adhesion properties. In the process described in DE-A-39 03 538, the polyurethane is prepared in a low-boiling, water-miscible solvent, the adhesion-improving polymer is then added and only thereafter is the resulting mixture dispersed in water.

This gives stable aqueous dispersions in which the added polymer is probably present in the interior of the dispersed particles and is surrounded by a stabilizing polyurethane layer. In particular, these dispersions have good initial adhesive strength when used as adhesives. However, the heat distortion resistance of the adhesive coatings prepared is still unsatisfactory.

It is an object of the present invention to provide dispersions having good adhesive properties and giving adhesive bonds with improved heat distortion resistance.

We have found that this object is achieved by the dispersions defined at the outset and by their use as adhesives.

Preferred embodiments of the invention are described in the subclaims.

The novel emulsifier-free dispersions contain a polyurethane and from 5 to 60, preferably from 10 to 30%, by weight, based on the polyurethane, of an adhesion-improving polymer.

The polyurethane consists essentially, preferably exclusively, of the components (a) to (e). The functional groups reactive toward isocyanate are hydroxyl or primary or secondary amino groups.

Suitable diisocyanates (a) are aliphatic, cycloaliphatic and aromatic diisocyanates. Those of the general formula X(NCO)$_2$ are preferably used, X being an aliphatic hydrocarbon radical of 4 to 12 carbon atoms, a cycloaliphatic radical of 6 to 15 carbon atoms or an aromatic hydrocarbon radical of 6 to 15 carbon atoms.

Examples of suitable aliphatic, cycloaliphatic and aromatic diisocyanates are butane 1,4-diisocyanate, hexane 1,6-diisocyanate, 2,2,4- and 2,4,4-trimethylhexamethylene diisocyanate, cyclohexane diisocyanate, methylcyclohexane diisocyanate, isophorone diisocyanate, 4,4'-diisocyanatodiphenylmethane, 4,4'-diisocyanatodicyclohexylmethane and 2,4- and 2,6-toluylene diisocyanate.

Mixtures of the diisocyanates may also be used. Mixtures of aliphatic or cycloaliphatic diisocyanates with aromatic diisocyanates in a molar ratio of from 1 : 4 to 5 : 1 have proven particularly suitable.

In addition to the diisocyanates, minor amounts of monoisocyanates may also be used for molecular weight regulation.

Suitable dihydroxy compounds (b) having a molecular weight of more than 500 to 5,000 are the known polyesters, polyethers, polythioethers, polylactones, polyacetals, polycarbonates and polyesteramides having 2 hydroxyl groups. Preferred dihydroxy compounds are those whose molecular weight is from 750 to 3,000. Mixtures of these dihydroxy compounds may of course also be used.

Examples of suitable components (c) are aliphatic, cycloaliphatic or aromatic mono- or dihydroxycarboxylic acids. Dihydroxyalkanecarboxylic acids, in particular those of 3 to 10 carbon atoms, as also described in U.S Pat. No. 3,412,054, are preferred. Compounds of the general formula

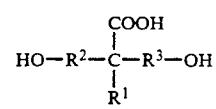

where R$^1$ is hydrogen or alkyl of 1 to 4 carbon atoms and R$^2$ and R$^3$ are each C$_1$–C$_4$-alkylene, are particularly preferred. An example is 2,2-dimethylolpropionic acid.

Tertiary ammonium salts containing one or two hydroxyl or amino groups and aminocarboxylic acids or aminosulfonic acids, for example lysine, β-alanine or N-(2-aminoethyl)-2-aminoethanesulfonic acid, and the adducts stated in DE-A-20 34 479 and obtained from aliphatic diprimary dismines and α-olefinic carboxylic acids, for example the adduct of ethylenediamine with acrylic acid, are also noteworthy.

Component (c) contains ionic groups or groups convertible into ionic groups, in order to ensure the dispersibility of the polyurethane in water. Their amount is usually from 0.03 to 0.5, preferably from 0.05 to 0.4, gram equivalent, based on 1 mol of isocyanate groups.

Inorganic and/or organic bases, such as sodium hydroxide, potassium hydroxide, potassium carbonate, sodium bicarbonate, ammonia or primary, secondary and in particular tertiary amines, e.g. triethylamine or dimethylaminopropanol, can be used for converting potential anionic groups, for example carboxylic acid groups or sulfonic acid groups, into ionic groups.

For converting potential cationic groups, for example the tertiary amino groups, into the corresponding cations, for example ammonium groups, suitable neutralizing agents are inorganic or organic acids, e.g. hydrochloric acid, acetic acid, fumaric acid, maleic acid, lactic acid, tartaric acid, oxalic acid or phosphoric acid, and suitable quaternizing agents are, for example, methyl chloride, methyl iodide, dimethyl sulfate, benzyl chloride, ethyl chloroacetate or bromoacetamide. Further suitable neutralizing agents and quaternizing agents are described in, for example, U.S. Pat. No. 3,479,310, column 6.

The neutralization or quaternization of the ionic or potential ionic groups can be carried out before, during or, in particular, after the isocyanate polyaddition reaction.

If necessary, nonionic emulsifiers, such as monohydric polyether alcohols having a molecular weight of from 500 to 10,000, preferably from 1,000 to 5,000, g/mol, may also be present. However, the use of nonionic emulsifiers is generally unnecessary owing to the content of compounds (c).

The compounds (d) are compounds having at least three, in particular three, isocyanate groups or groups reactive to isocyanate. For example, triols, such as trimethylolpropane or glycerol, trihydroxy compounds containing ether and ester groups, triamine compounds, such as diethylenetriamine, 4-aminomethyloctanediamine, trisaminoethylamine, hydroxyl- and amino-containing compounds, such as diethanolamine or triisocyanate compounds, such as biorets or isocyanurates, for example of isophorone diisocyanate or of hexane 1,6-diisocyanate, are suitable. The molecular weight of the compounds (d) is usually from 60 to 500 g/mol. (d) are preferably compounds having 3 groups reactive toward isocyanate.

Components (e) are essentially compounds which contain two hydroxyl groups, two amino groups or one hydroxyl and one amino group. For example, dihydroxy compounds, such as 1,3-propanediol, 1,4-butanediol, dismines, such as ethylenediamine, hexamethylenediamine, piperazine, 2,5-dimethylpiperazine, 1-amino-3-aminomethyl-3,5,5-trimethylcyclohexane (isophoronediamine), 4,4'-diaminodicyclohexylmethane, 2,4-diaminocyclohexane, 1,2-diaminopropane, hydrazine or amino alcohols, such as ethanolamine, isopropanolamine, methylethanolamine or aminoethoxyethanol, are suitable.

The amounts of components (a) to (e) are chosen in particular so that the sum of the hydroxyl or amino groups reactive toward isocyanate is from 0.9 to 1.1, preferably from 0.95 to 1.05, gram equivalents per gram equivalent of isocyanate.

The number of functional groups reactive toward isocyanate is particularly preferably about the same as the number of isocyanate groups.

Components (e) may be unnecessary or the amount thereof can at least be kept low, for example below 0.4 gram equivalent, based on 1 mol of isocyanate groups, since the chain extension can essentially also be effected by component (d).

The amount of component (d) is chosen so that the functionality F, which is defined as $$F = \frac{\text{Number of moles of all isocyanate groups and functional groups reactive with isocyanate}}{\text{Number of moles of all components}}$$

is from 2.01 to 2.5, preferably from 2.01 to 2.20 and particularly preferably from 2.01 to 2.10.

The denominator in the formula comprises the sum of the number of moles of the components involved in the synthesis of the polyurethane, which contain one or more isocyanate groups or functional groups reactive with isocyanate, for example the components (a), (b), (c), (d) and/or (e).

If only difunctional compounds are used, F is 2.

For the preparation of the polyurethane, the components (a) to (e) can be reacted in a known manner in a low-boiling, water-miscible organic solvent, as also described, for example, in DE-A-34 37 918.

Preferred solvents are, for example, tetrahydrofuran, methyl ethyl ketone, N-methylpyrrolidone and in particular acetone.

The reaction temperature is preferably from 50° to 100° C.

Conventional and known catalysts, such as dibutyltin dilaurate, tin(II) octoate or 1,4-diazabicyclo[2.2.2]octane, may also be present for accelerating the reaction of the diisocyanates.

The resulting polyurethane, which is essentially free of isocyanate groups, is then dispersed in water after the addition of the adhesion-improving polymer, and the organic solvent is removed to the required extent, in general completely, by distillation.

The polyurethane can also be prepared by first preparing a polyurethane prepolymer in the low-boiling water-miscible organic solvent. In particular, at least the components (a), (b) and parts of (c) are reacted with one another for this purpose. After the addition of the adhesion-improving polymer, the resulting polyurethane prepolymer, which still contains isocyanate groups, is dispersed in water. The reaction with the further components can then be carried out. The organic solvent can then be removed, as described above.

Suitable adhesion-promoting polymers are a large number of different polycondensates, polymers obtained by free radical polymerization or polyadducts.

The adhesion-improving polymers are preferably phenol/formaldehyde condensation resins, in particular those having weight average molecular weights ($\overline{M}_w$) of from 500 to 2,000 and softening temperatures (measured according to DIN 53,736) of from 80° to 130° C. The phenol/formaldehyde condensation resins are particularly preferably novolaks as obtainable by acid-catalyzed reaction of phenols, in particular phenol or $C_1$-$C_{10}$-alkyl-substituted phenols, with formaldehyde. In particular, from 1.05 to 1.3 mol of phenols are used per mol of formaldehyde in the reaction.

Epoxy resins, preferably the reaction products of epoxides, such as epichlorohydrin with bisphenol A are also particularly suitable; those having weight average molecular weights ($\overline{M}_w$) of from 500 to 5,000 and softening temperatures from 80° to 130° C. are preferred.

Other suitable adhesion-promoting polymers are polyvinyl acetate, polyvinyl chloride, polymethacrylates, polyamides, polyethers, polyesters, polyetherdiols, polyesterdiols, polyurethanes, in particular polyurethanes free of salt groups, and phenacrylate.

Preferred polyvinyl acetates are the homopolymers of vinyl acetate. Its copolymers which contain up to 10% by weight of comonomers, such as vinyl laurate, vinyl stearate or preferably (meth)acrylates, fumarates or maleates with $C_1$-$C_8$-alkanols, such as methanol, n-butanol or 2-ethylhexanol, may also be used. The polymers usually have a K value, measured at 25° C. in cyclohexanone according to DIN 53,726, of from 45 to 60. Polyvinyl chloride is understood in general as being the homopolymers of vinyl chloride and its copolymers which contain up to 10% by weight of comonomers, such as ethylene or vinyl acetate. Their K value (25° C., cyclohexanone, DIN 53,726) should be from 45 to 55. The skilled worker usually uses, as the polymethacrylate, homopolymers of methyl acrylate or its copolymers with up to 10% by weight, based on the copolymer, of vinyl acetate, acrylates of $C_1$-$C_8$-alkanols or methacrylates with $C_2$-$C_8$-alkanols. Their melt flow index MFI, determined according to DIN 53,735 (230° C./3.8 kg), is in general from 0.1 to 3.0. These polymers are generally prepared by free radical mass, solution or emulsion polymerization of the ethylenically unsaturated monomers at from 30° to 150° C. with subsequent drying. Such polymers are generally known, for example from Houben-Weyl, Methoden der organischen Chemie, Volume E20, 1987, pages 1115–1125, 1041–1062 and 1141–1174.

Suitable polyamides have a K value of from 65 to 80, measured in $H_2SO_4$ at 25° C. according to DIN 53,727. They are usually polymers which are derived from lactams having from 7 to 13 ring members, such as ε-caprolactam, ε-capryllactam or ω-laurolactam, for example polycaprolactam (PA6), and polyamides which are obtained by reacting dicarboxylic acids with dismines. Examples of these are polyhexamethyleneadipamide (PA66), polyhexamethylenesebacamide (PA610) or polyhexamethylenedodecanamide (PA612). Examples of suitable dicarboxylic acids are alkanedicarboxylic acids of 4 to 12, in particular 6 to 10, carbon atoms, as well as phthalic acid, terephthalic acid and isophthalic acid and any mixtures of these acids. Examples of dismines are alkanediamines of to 12, in particular 4 to 8, carbon atoms and m-xylylenediamine, p-xylylenediamine, hydrogenated derivatives thereof, bis-(4-aminophenyl)-methane, bis-(4-aminocyclohexyl)-methane or 2,2-bis-(4-aminophenyl)-propane or mixtures thereof. Copolymers are preferred owing to the good solubility, for example a copolyamide of from 30 to 40% by weight of adipic acid, from 15 to 20% by weight of hexamethylenediamine, from 30 to 35% by weight of caprolactam and from 15 to 20% by weight of ε-aminocaproic acid. The preparation of these known polymers is generally known, cf. for example Römpp, Chemielexikon, 8th Edition, pages 2861, 3058 and 3267, EP-A-129 195 and EP-A-129 196.

The polyetherdiols are known per se, for example from Kunststoff-Handbuch 7 (1983), 42–54. Examples are polyethylene oxide, polypropylene oxide or polytetrahydrofuran or copolymers thereof with two terminal hydroxyl groups. They are prepared in a known manner, in general by anionic polyaddition (cf. for example N. G. Gaylord, High Polymers, Vol. 13, New York 1963, Part I). Polyetherols, which are grafted with ethylene oxide to increase the reactivity are of minor importance. The polyetherdiols generally have a molecular weight of from 300 to 3,000, which corresponds to a K value of from 25 to 60 in DMF at 25° C. according to DIN 53,726. Preferred molecular weights are from 800 to 2,200.

The polyethers used are, for example, polyethylene oxide, polypropylene oxide or polytetrahydrofuran. The polyethers usually have a K value of from 20 to 50 in DMF at 25° C. according to DIN 53,726. They are generally known, for example from Encyclopedia of Polymer Science and Technology, Volume 6, 1967, page 103 et seq., Volume 9, 1968, page 668 et seq. and Volume 13, 1970, page 670 et seq.

Preferred polyesters are monomer-free unsaturated polyester resins. These are known condensates of polybasic, in particular dibasic, carboxylic acids or esterifiable derivatives thereof, in particular their anhydrides, which are esterified with polyhydric, in particular dihydric, alcohols, and may contain additional radicals of monobasic carboxylic acids or monohydric alcohols. Examples of starting materials are maleic acid, fumaric acid, phthalic acid, isophthalic acid, terephthalic acid, maleic anhydride, phthalic anhydride, isophthalic anhydride, ethylene glycol, propylene glycol, 1,4-butanediol or neopentylglycol. For the purposes of the present invention, resins which are prepared by cocondensation of bisphenol A, epichlorohydrin/bisphenol A condensates and methacrylic acid are of minor importance. In this context, monomer-free means that these UP resins are not dissolved in monomers suitable for crosslinking, such as styrene. The products usually have a viscosity of from 1,000 to 6,000, in particular from 2,000 to 4,000, mpa.s at 150° C.

Suitable polyesterdiols are condensates which have two terminal OH groups and are obtained from dicarboxylic acids, such as adipic acid or isophthalic acid, and diols, for example 1,4-butanediol, 1,6-hexanediol or neopentylglycol.

The molecular weight range of the polyesterdiols which can be used is in general from 300 to 5,000. A preferred molecular weight is from 800 to 2,500, corresponding to a K value of 30 to 55 in DMF at 25° C. according to DIN 53,276. These polymers and their preparation are generally known from Kunststoff-Handbuch 7 (1983), 54–62 and DE 1 268 842.

Polyurethanes free of salt groups are known addition polymers based on polyetherdiols or polyesterdiols, isocyanates, such as hexamethylene diisocyanate, or 2,4-diisocyanatodiphenylmethane, and possibly bi- or trifunctional chain extenders which are prepared by conventional processes (Kunststoff-Handbuch, Karl-Hanser-Verlag, Volume 7 (1966). Low molecular weight condensates (K value of from 25 to 60 in DMF at 25° C. according to DIN 53,726) are preferably used. Crosslinked polyurethanes are of minor importance.

Phenacrylates are preferably prepared by subjecting bisphenol A glycidyl ethers esterified with acrylic or methacrylic acid to an addition reaction with terephthalic acid. Phenacrylates based on epoxidized novolaks may also be used. The K values of the polymers are in general from 30 to 55 (in cyclohexane at 25° C. according to DIN 53,726).

The adhesion-improving polymer is added to the polyurethane or the prepolymer thereof, which are present in a low-boiling water-miscible solvent, before the dispersing in water. In principle the resin can be added to the reaction mixture of the starting components of the polyurethane at any time. However, it is particularly advantageous not to add the resin until the synthesis of the prepolymer is at an advanced stage and the NCO content of the prepolymer has reached a value of less than 5% by weight. Especially in the case of resins having groups particularly reactive toward isocyanates, for example novolaks, the resins should be incorporated only in a polyurethane having an NCO content close to 0% by weight. The polymer may be added as such or as d solution. Other suitable solvents for the polymer, in addition to water (for example in the case of phenol/formaldehyde resins), are in particular low-boiling, water-miscible organic solvents.

The novel dispersion finally obtained after dispersing the mixture in water, if necessary converting the polyurethane prepolymer into the polyurethane and if required distilling off the organic solvent preferably has a solids content of from 10 to 70, in particular from 20 to 50, % by weight.

The novel dispersions can be used directly as contact adhesives for the adhesive bonding of various substrates, for example of wood, plastic, glass and metal. Further additives, such as plasticizers, film-forming assistants, fillers, etc. may be added to the dispersions for achieving specific properties. Adhesive coatings are advantageously applied to the surfaces of both substrates to be adhesively bonded.

The dispersions possess good adhesive properties, in particular good initial adhesive strength, and high heat distortion resistance of the adhesive bonds produced.

The symbols used in the Examples below have the meanings stated below:

ADA = Adipic acid
B14 = 1,4-Butanediol
TDI = Toluylene diisocyanate
HDI = Hexamethylene diisocyanate
IPDI = Isophorone diisocyanate
PUD = Na salt of the Michael adduct of acrylic acid and ethylenediamine
DBTL = Dibutyltin dilaurate
DMPA = Dimethylolpropionic acid
TMP = Trimethylolpropane

COMPARATIVE EXAMPLE 1

IPDI and HDI were added at 60° C. to a mixture of dehydrated polyesterdiol, prepared from adipic acid and butanediol, DMPA, 1,4-dihydroxybutane, acetone I and catalyst. After a reaction time of two hours at 70° C., the acetone II was added and the reaction mixture then had an NCO content of 0.60% by weight. Chain extension was then effected at 50° C. with PUD salt, which was present as a 40% strength solution in water. The resin solution, prepared from acetone III and a phenol/formaldehyde condensate, was added after 5 minutes, and stirring was carried out for 5 minutes at 50° C. Dispersing was then effected with water and the acetone was distilled off.

The resulting finely divided dispersion had a solids content of 41% by weight. The functionality of all components was 2.

|  | Molar amount [mmol] | Parts by weight [g] |
|---|---|---|
| Polyesterdiol (OH No. = 45.0) | 162 | 403 |
| DMPA | 28 | 3.8 |
| 1,4-Dihydroxybutane | 323 | 29.1 |
| IPDI | 289 | 64.3 |
| HDI | 289 | 48.6 |
| DBTL |  | 0.1 |
| Acetone I |  | 133 |
| Acetone II |  | 533 |
| PUD salt (40% strength) | 66 | 28.7 |
| Phenol/formaldehyde condensate, M_w = about 600–1200, softening temperature 90–110° C.* |  | 240 |
| Acetone III |  | 240 |
| Demineralized water |  | 1200 |

*Determined according to DIN 53,736

COMPARATIVE EXAMPLE 2

TDI was added to a mixture of dehydrated polytetrahydrofuran, DMPA, 1,4-dihydroxybutane, acetone I and catalyst. After a reaction time of one hour at 65° C., HDI was added and the reaction was continued for a further 90 minutes. After the addition of acetone II, the reaction mixture had an NCO content of 0.46%. Chain extension was effected at 50° C. with PUD salt, which was present as 40% strength solution in water. The resin solution, prepared from acetone III and a phenol/formaldehyde condensate, was added after 5 minutes, and stirring was carried out for 5 minutes at 50° C. Dispersing was then effected with water and the acetone was distilled off.

The resulting finely divided dispersion had a solids content of 41%. The functionality of all components of the copolymer was 2.

|  | Molar amount [mmol] | Parts by weight [g] |
|---|---|---|
| Polytetrahydrofuran (OH No. = 55.9) | 179 | 359 |
| DMPA | 28 | 3.8 |
| 1,4-Dihydroxybutane | 536 | 48.3 |
| TDI | 399 | 69.6 |
| HDI | 405 | 68.2 |
| DBTL |  | 0.1 |
| Acetone I |  | 133 |
| Acetone II |  | 533 |
| PUD salt (40% strength) | 66 | 28.7 |
| Phenol/formaldehyde condensate, M_w = about 600–1200, softening temperature 90–110° C.* |  | 240 |
| Acetone III |  | 240 |
| Demineralized water |  | 1200 133 |

COMPARATIVE EXAMPLE 3

TDI was added at 60° C. to a mixture of dehydrated polyesterol, prepared from adipic acid and butanediol, DMPA, 1,4-butanediol, acetone I and catalyst. HDI was added after a reaction time of one hour at 65° C., and acetone II was added after a reaction time of a further two hours at 70° C., after which the reaction mixture had an NCO content of 0.56%.

Chain extension was effected at 50° C. with PUD salt, which was present as 40% strength solution in water. The resin solution, prepared from acetone III and a phenol/formaldehyde condensate, was added after 5 minutes and stirring was carried out for 5 minutes at 50° C. Dispersing was then effected with water and the acetone was distilled off.

The resulting finely divided dispersion had a solids content of 41%. The functionality of all components of the copolymer was 2.

|  | Molar amount [mmol] | Parts by weight [g] |
|---|---|---|
| Polyesterdiol (OH No. = 45.0) | 194 | 481 |
| DMPA | 28 | 3.8 |
| 1,4-Butanediol | 59 | 5.2 |
| TDI | 170 | 29.6 |
| HDI | 172 | 29.0 |
| DBTL |  | 0.1 |
| Acetone I |  | 133 |
| Acetone II |  | 533 |
| PUD salt (40% strength) | 66 | 28.7 |
| Phenol/formaldehyde condensate, M_w = about 600–1200, softening temperature 90–110° C. |  | 240 |
| Acetone III |  | 240 |

| | Molar amount [mmol] | Parts by weight [g] |
| --- | --- | --- |
| Demineralized water | | 1200 |

COMPARATIVE EXAMPLE 4

TDI was added to a mixture of dehydrated polyesterol, prepared from adipic acid and 1,4-butanediol, 1,4-butanediol, acetone I and catalyst. After a reaction time of one hour at 65° C., HDI was added and the reaction was continued for a further 90 minutes. After the addition of acetone II, the reaction mixture had an NCO content of 0.75%.

Chain extension was effected at 50° C. with PUD salt, which was present as 40% strength solution in water. The resin solution, prepared from acetone III and a condensate of bisphenol A and epichlorohydrin, was added after 5 minutes and stirring was carried out for 5 minutes at 50° C. Dispersing was then effected with water and the acetone was distilled off. The functionality of all components of the copolymer was 2.

| | Molar amount [mmol] | Parts by weight [g] |
| --- | --- | --- |
| Polyesterdiol ADA/B14 (OH No. 45.0) | 191 | 476 |
| 1,4-Butanediol | 72 | 6.5 |
| TDI | 178 | 31.0 |
| HDI | 178 | 30.0 |
| DBTL | | 0.1 |
| Acetone I | | 133 |
| PUD salt (40% strength) | 94 | 16.4 |
| Acetone II | | 532 |
| Epikote 1007 (condensation resin of bisphenol A and epichlorohydrin, $M_w$ about 1550–2000) | | 240 |
| Acetone III | | 240 |
| Demineralized water | | 1200 |

COMPARATIVE EXAMPLE 5

TDI was added to a mixture of dehydrated polyesterol, prepared from adipic acid and 1,4-butanediol, DMPA, acetone I and catalyst. After a reaction time of one hour at 65° C., HDI was added and the reaction was continued for a further 90 minutes. After the addition of acetone II, the reaction mixture had an NCO content of 0.65%. The reaction mixture was cooled to 30° C. and mixed with the resin solution prepared from Epikote 1007 and acetone III. Thereafter, neutralization was effected with triethylamine and dispersing with demineralized water. Chain extension was then carried out with isophoronediamine and the acetone was distilled off. The functionality of all components of the copolymer was 2.

| | Molar amount [mmol] | Parts by weight [g] |
| --- | --- | --- |
| Polyesterdiol ADA/B14 (OH No. 45.0) | 177 | 440 |
| 1,4-Butanediol | 53 | 4.8 |
| TDI | 234 | 40.8 |
| HDI | 234 | 39.4 |
| DBTL | | 0.1 |
| Acetone I | | 133 |
| Acetone II | | 534 |
| Epikote 1007 (condensation resin of bisphenol A and epichlorohydrin, $M_w$ about 1550–2000) | | 240 |
| Acetone III | | 240 |

| | Molar amount [mmol] | Parts by weight [g] |
| --- | --- | --- |
| Isophoronediamine | 85 | 14.5 |
| Demineralized water | | 1200 |

EXAMPLE 1

IPDI and HDI were added at 60° C. to a mixture of dehydrated polyesterol, prepared from adipic acid and butanediol, DMPA, 1,4-dihydroxybutane, TMP, acetone I and catalyst. After a reaction time of two hours at 70° C., the actone II was added, after which the reaction mixture had an NCO content of 0.58%.

Chain extension was effected at 50° C. with PUD salt, which was present as 40% strength solution in water. The resin solution, prepared from acetone III and a phenol/formaldehyde condensate, was added after 5 minute and stirring was carried out for 5 minutes at 50° C. Dispersing was then effected with water and the acetone was distilled off. The functionality of all components of the copolymer was 2.03.

| | Molar amount [mmol] | Parts by weight [g] |
| --- | --- | --- |
| Polyesterdiol (OH No. = 45.0) | 162 | 403 |
| DMPA | 28 | 3.8 |
| 1,4-Dihydroxybutane | 275 | 24.8 |
| TMP | 32 | 4.3 |
| IPDI | 289 | 64.3 |
| HDI | 289 | 48.6 |
| DBTL | | 0.1 |
| Acetone I | | 133 |
| Acetone II | | 533 |
| PUD salt (40% strength) | 66 | 28.7 |
| Phenol/formaldehyde condensate, $M_w$ = about 600–1200, softening temperature 90–110° C. | | 240 |
| Acetone III | | 240 |
| Demineralized water | | 1200 |

EXAMPLE 2

TDI was added to a mixture of dehydrated polytetrahydrofuran, DMPA, 1,4-dihydroxybutane, TMP, acetone I and catalyst. After a reaction time of one hour at 65° C., HDI was added and the reaction was continued for a further 90 minutes. After the addition of acetone II, the reaction mixture had an NCO content of 0.60%.

Chain extension was effected at 50° C. with PUD salt, which was present as 40% strength solution in water. The resin solution, prepared from acetone III and a phenol/formaldehyde condensate, was added after 5 minutes and stirring was carried out for 5 minutes at 50° C. Dispersing was then effected with water and the acetone was distilled off.

The resulting finely divided dispersion had a solids content of 41%. The functionality of all components of the copolymer was 2.01.

| | Molar amount [mmol] | Parts by weight [g] |
| --- | --- | --- |
| Polyesterdiol (OH No. = 55.9) | 178 | 357 |
| DMPA | 28 | 3.8 |
| 1,4-Dihydroxybutane | 516 | 46.5 |
| TMP | 18 | 2.4 |
| TDI | 402 | 70.1 |
| HDI | 408 | 68.7 |
| DBTL | | 0.1 |

|  | Molar amount [mmol] | Parts by weight [g] |
| --- | --- | --- |
| Acetone I |  | 133 |
| Acetone II |  | 533 |
| PUD salt (40% strength) | 66 | 28.7 |
| Phenol/formaldehyde condensate, $M_w$ = about 600–1200, softening temperature 90–110° C. |  | 240 |
| Acetone III |  | 240 |
| Demineralized water |  | 1200 |

EXAMPLE 3

TDI was added at 60° C. to a mixture of dehydrated polyesterol, prepared from adipic acid and butanediol, DMPA, TMP, acetone I and catalyst. HDI was added after a reaction time of one hour at 65° C., and the acetone II 70° C., after which the reaction mixture had an NCO content of 0.56%.

Chain extension was effected at 50° C. with PUD salt, which was present at 40% strength solution in water. The resin solution, prepared from acetone III and a phenol/formaldehyde condensate, was added after 5 minutes and stirring was carried out for 5 minutes at 50° C. Dispersing was then effected with water and the acetone was distilled off.

The resulting finely divided dispersion had a solids content of 41%. The funtionality of all components of the copolymer was 2.06.

|  | Molar amount [mmol] | Parts by weight [g] |
| --- | --- | --- |
| Polyesterdiol (OH No. = 45.2) | 194 | 481 |
| DMPA | 28 | 3.8 |
| TMP | 32 | 4.3 |
| TDI | 172 | 29.7 |
| HDI | 173 | 29.1 |
| DBTL |  | 0.1 |
| Acetone I |  | 133 |
| Acetone II |  | 533 |
| PUD salt (40% strength) | 66 | 28.7 |
| Phenol/formaldehyde condensate, $M_w$ = about 600–1200, softening temperature 90–110° C. |  | 240 |
| Acetone III |  | 240 |
| Demineralized water |  | 1200 |

EXAMPLE 4

TDI was added to a mixture of dehydrated polyesterol, prepared from adipic acid and 1,4-butanediol, TMP, acetone I and catalyst. After a reaction time of one hour at 65° C., HDI was added and the reaction was continued for a further 90 minutes. After the addition of acetone II, the reaction mixture had an NCO content of 0.74%.

Chain extension was effected at 50° C. with PUD salt, which was present as 40% strength solution in water. The resin solution, prepared from acetone III and a condensate of bisphenol A and epichlorohydrin, was added after 5 minutes and stirring was carried out for 5 minutes at 50° C. Dispersing was then effected with water and the acetone was distilled off.

The funtionality of all components of the copolymer was 2.07.

|  | Molar amount [mmol] | Parts by weight [g] |
| --- | --- | --- |
| Polyesterdiol ADA/B14 (OH No. 45.0) | 191 | 476 |

|  | Molar amount [mmol] | Parts by weight [g] |
| --- | --- | --- |
| TMP | 48 | 6.4 |
| TDI | 178 | 31.0 |
| HDI | 178 | 30.0 |
| DBTL |  | 0.1 |
| Acetone I |  | 133 |
| PUD salt (40% strength) | 94 | 40.95 |
| Acetone II |  | 532 |
| Epikote 1007 (condensation resin of bisphenol A and epichlorohydrin, $M_w$ about 1550–2000) |  | 240 |
| Acetone III |  | 240 |
| Demineralized water |  | 1200 |

EXAMPLE 5

TDI was added to a mixture of dehydrated polyesterol, prepared from adipic acid and 1,4-butanediol, TMP, DMPA, acetone I and catalyst. After a reaction time of one hour at 65° C., HDI was added and the reaction was continued for a further 90 minutes. After the addition of acetone II, the reaction mixture had an NCO content of 0.60%. The reaction mixture was cooled to 30° C. and mixed with the resin solution, prepared from Epikote 1007 and acetone III. Thereafter, neutralization was effected with triethylamine and dispersing with demineralized water. Chain extension was then carried out with isophoronediamine and the acetone was distilled off. The functionality of all components of the copolymer was 2.04.

|  | Molar amount [mmol] | Parts by weight [g] |
| --- | --- | --- |
| Polyesterdiol ADA/B14 (OH No. 44.4) | 175 | 441 |
| TMP | 35 | 4.7 |
| DMPA | 157 | 21.1 |
| TDI | 232 | 40.4 |
| HDI | 232 | 39.0 |
| DBTL |  | 0.1 |
| Acetone I |  | 133 |
| Acetone II |  | 534 |
| Triethylamine | 157 | 15.9 |
| Epikote 1007 (condensation resin of bisphenol A and epichlorohydrin, $M_w$ about 1550–2000) |  | 240 |
| Acetone III |  | 240 |
| Demineralized water |  | 1200 |
| Isophoronediamine | 85 | 14.5 |

Adhesion Properties Of The Dispersions Prepared

Testing The Contact Adhesion At Room Temperature

Shear strength:

The dispersions were thickened with 5% by weight, based on their solids content, of pyrogenic silica, applied with a knife coater with 1 mm teeth to beechwood panels over an area of 150×50 mm² and dried for 60 minutes at room temperature. The beechwood panels were then adhesively bonded with one another by pressing them for 30 seconds at room temperature under a pressure of 0.5N/mm². The shear strength was determined immediately and after storage for 7 days at room temperature, by means of the force in N/mm² which was required to pull off the beechwood panels in the longitudinal direction. Heat distortion resistance:

A hardboard panel was adhesively bonded over an area of 200×200 mm² to a PVC film (contact adhesion at room temperature). The PVC film was loaded with 300 g at a peel angle of 180°. The temperature was increased by 10° C. every 30 minutes. The distance covered within these 30 minutes is stated in mm.

TABLE

|  | Shear strength Immediately/7 days [N/mm] | Heat distortion resistance [°C./N] |
|---|---|---|
| Comparative Example 1 | 1.4/5.6 | 70/4, 80/—* |
| Comparative Example 2 | 0.8/2.3 | 70/3, 80/— |
| Comparative Example 3 | 1.3/2.4 | 40/0, 50/— |
| Example 1 | 1.5/4.9 | 70/1, 80/1, 90/1, 100/5, 110/— |
| Example 2 | 1.1/2.1 | 70/1, 80/1, 90/5 100/— |
| Example 3 | 1.6/4.9 | 40/0, 50/0, 60/1, 70/1 80/2, 90/2, 100/8 110/— |
| Example 4 | 1.1/3.5 | 40/0, 50/0, 60/1, 70/1, 80/1, 90/1, 100/— |

*Complete distance has been covered, ie. PVC film is detached

Testing The Contact Adhesion After Flash Activation Peel strength:

The dispersions were applied by means of a brush (1 inch, fine bristles) uniformly to styrene/butadiene rubber (SBRI rubber having a Shore A hardness (cf. DIN 16,909)) over an area of 30×130 mm² and dried for 45 minutes at room temperature. After the adhesive films had been heated once to 80° C. in the course of about 5 seconds by IR radiation (flash activation), 2 samples were pressed together for 10 seconds under 0.5N/mm². The peel strength was measured immediately and after storage for 5 days in a conditioned room (23° C./50% relative humidity), according to DIN 52,273.

Heat distortion resistance:

The test specimens were prepared as for the peel strength test. After being heated for 1 hour at 50° C., they were loaded with 5, 10, 15, 20, 25 and 30N in ascending order at 50° C. for 10 minutes in each case. If the adhesive bond held, the load was removed from the sample and the latter was heated for 30 minutes at 60° C. and tested in the same manner up to a maximum of 30N in 10 minute steps. After each cycle, the temperature was increased by 10° C. and the test was repeated in the same manner. The temperature (°C.) and the load (N) at which opening of the adhesive bond by more than 50 mm was detectable are stated in each case.

|  | Shear strength [N/mm] | Heat distortion resistance [°C./N] |
|---|---|---|
| Comparative Example 1 | 1.5/2.2 | 50/05 |
| Comparative Example 4 | 1.9/2.1 | 50/05 |
| Comparative Example 5 | 3.6/1.3 | 50/20 |
| Example 1 | 2.2/3.1 | 70/10 |
| Example 4 | 2.3/2.5 | 70/30 |
| Example 5 | 2.7/4.2 | 70/20 |

We claim

1. An aqueous dispersion containing a polyurethane and from 5 to 60% by weight, based on the polyurethane, of an adhesion-improving polymer, wherein the polyurethane consists essentially of
   (a) organic diisocyanates,
   (b) dihydroxy compounds which have a molecular weight of from more than 500 to 5,000 and contain no ionic groups or groups convertible into ionic groups,
   (c) compounds having one or two functional groups reactive toward isocyanate and at least one ionic group or group convertible into an ionic group and
   (d) compounds having at least 3 isocyanate groups or at least 3 functional groups reactive toward isocyanate,
   (e) with or without compounds which differ from (c) and have two functional groups reactive toward isocyanate and a molecular weight of from 60 to 500, and compounds (d) are used in amounts such that the functionality F of all components, which is defined by the quotient $$F = \frac{\text{Number of moles of all isocyanate groups and functional groups reactive with isocyanate}}{\text{Number of moles of all components}}$$

is from 2.01 to 2.5, and the polyurethane or a prepolymer thereof is prepared in a water-miscible solvent boiling below 100° C. and, after addition of the adhesion-improving polymer, is dispersed in water and, in the case of the prepolymer, the further reaction to give the polyurethane is then carried out.

2. An aqueous dispersion as claimed in claim 1, wherein the adhesion-improving polymer is a phenol/formaldehyde resin or an epoxy resin.

3. The aqueous dispersion of claim 1, wherein said compound (d) is a triol, a trihydroxy compound containing ether and ester groups, a triamine compound, a hydroxylamino compound, a biurete or isocyanurate.

4. The aqueous dispersion of claim 3, wherein said triol is trimethylolpropane or glycerol, said triamine compound is diethylenetriamine, 4-aminomethyloctanediamine or trisaminoethylamine and said biurete or isocyanurate is the biurete or isocyanurate of isophorone diisocyante or of hexane 1,6-diisocyante.

5. The aqueous dispersion of claim 1, wherein said component (c) is an aliphatic, cycloaliphatic or aromatic mono- or dihydroxycarboxylic acid.

6. A process for the preparation of an aqueous dispersion as claimed in claim 1, which comprises:
   preparing said polyurethane or prepolymer thereof in a water-miscible solvent boiling below 100° C.; adding said adhesion-improving polymer to the prepared polyurethane or prepolymer thereof; dispersing said combined ingredients in water; and, in the case of the prepolymer, further reacting the prepolymer to provide the polyurethane.

7. An adhesive coating, comprising:
   applying the dispersion of claim 1 to a substrate, thereby providing an adhesive coating on said substrate.

* * * * *